United States Patent Office 3,269,287
Patented August 30, 1966

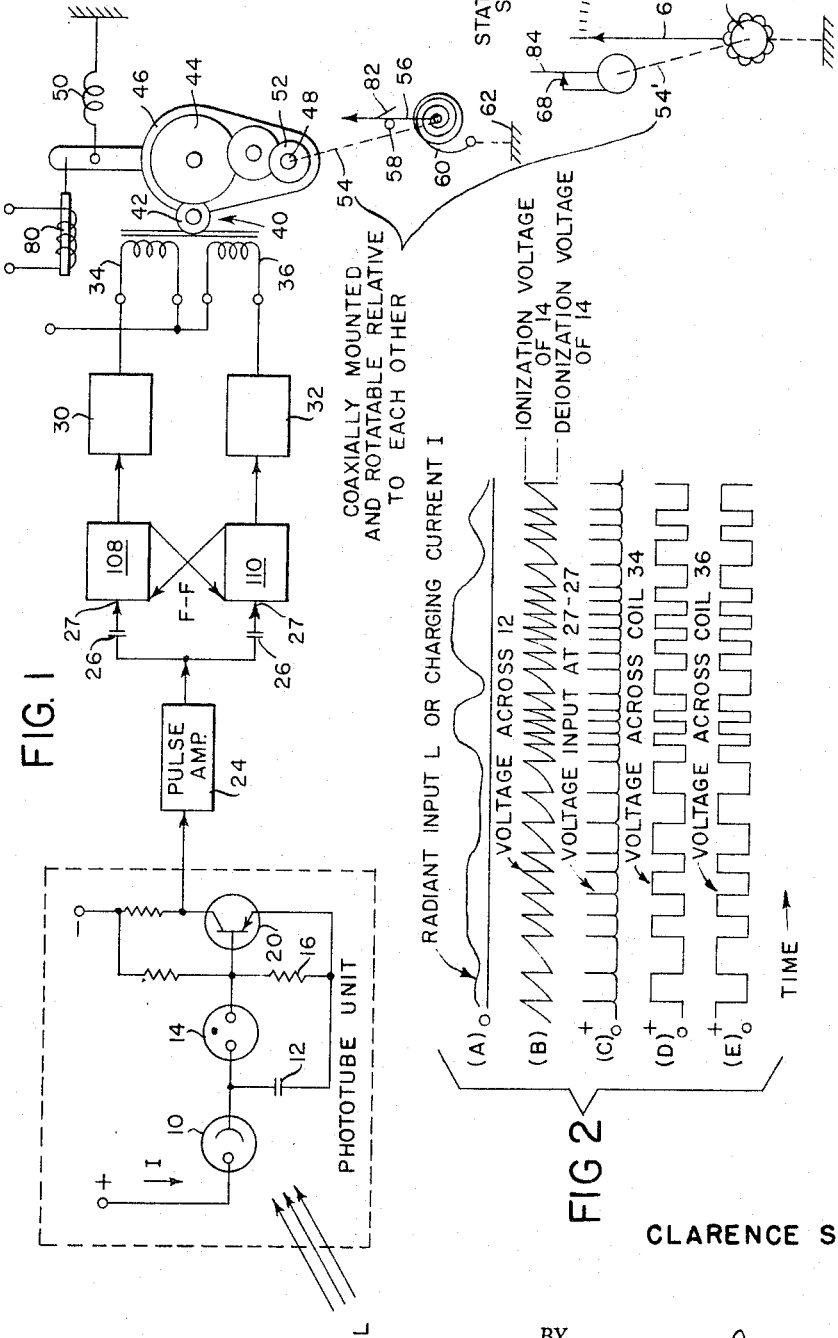

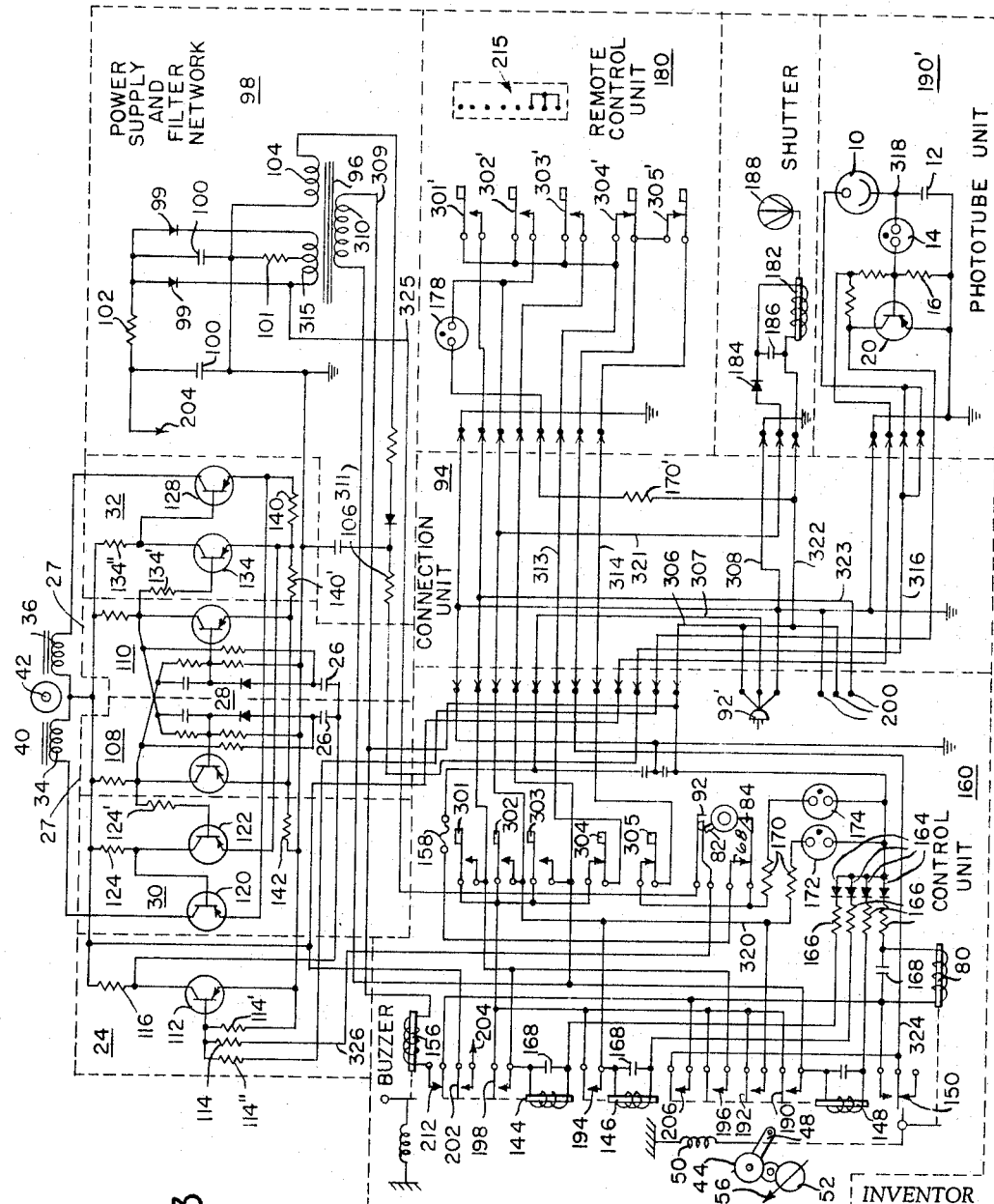

3,269,287
ELECTRONIC MECHANICAL SYSTEM FOR
INTEGRATING RADIANT ENERGY
Clarence S. Ost, 118 N. Mansfield Ave.,
Margate City, N.J.
Filed July 22, 1963, Ser. No. 296,825
14 Claims. (Cl. 95—10)

This invention relates to means for integrating radiant energy, and more particularly to a new and improved method of and apparatus for integrating radiant energy in measurable amounts, and for providing the resultant information in a usable form in the photographic art.

A main object of the invention is to provide a new and improved instrument for continuously integrating and indicating radiant energy quantity, and having means for indicating when a predetermined amount of radiant energy has been integrated or measured, the indication being in the form of an information signal which can be practically employed in photographic and other arts.

A further and highly important object of the invention is to provide an instrument which may be preset for the measurement of a specified amount of radiant energy, and wherein, regardless of the intensity of the radiation received by the sensing element of the instrument, the instrument will automatically record and indicate when the sensing element has received the desired preset amount of radiation.

The problem of automatically indicating when an amount of radiant energy has been received is of particular importance in the field of the graphic arts where high intensity arc lamps and other high intensity light sources are used such as the fields of photolithography, photoengraving and photogravure, where the crucial ingredient is the amount of light used in exposing a photosensitive surface and is accordingly the product of the light intensity and the time of exposure. Accordingly, there is a need for such a device in a substantial number of areas in the photographic art, and more particularly, when light is used to expose photosensitive materials and there are variations in the intensity of the light during the period of exposure. By the use of the teaching and embodiments of the present invention, a photosensitive surface may be exposed to a predetermined amount of light flux regardless of varying exterior and environmental light-producing conditions.

A still further object of the invention, in addition to the basic function of providing a preset radiant energy metering device, is to provide an instrument which also performs additional useful functions in convenience and automation related to the particular application with which it is involved. For example, it may be employed with a camera to automatically turn on the associated camera lamps and open the shutter at the start of an exposure, and then turn off the lamps and close the shutter when the photosensitive material has received the desired predetermined preset quantity of illumination. Another advantageous use of the present invention is in the photocomposing art, where the same exposure is given a great number of times, in this application the instrument of the present invention will automatically reset itself, saving valuable time.

My prior Patents 2,408,576, 2,440,522 and 2,944,190 describe instruments which find application in the field of graphic arts where they are used to meter predetermined quantities of illumination for and in the exposing of photosensitive material.

One of these patents describes generally a principle of connecting a condenser in series with a direct current source and a high vacuum photo-emissive type tube circuit. In parallel with the condenser is a series arrangement of a grid resistor, for a succeeding stage of amplification, and a gaseous discharge tube. The photo-emissive type tube is used as the sensing element by being exposed to the radiant energy to be integrated, and the resultant photo-emissive current charges the condenser until the voltage across it reaches the ionization potential of the gaseous discharge tube, at which time the gas in the tube ionizes, providing a discharge path for the condenser through the grid resistor. The amplified pulse therefrom is applied to the coil of a manually settable spring-wound, electromagnetically operated escapement mechanism, which in effect is a mechanical device for counting and indicating the pulses.

Another of the above patents is directed to a balanced bridge design utilizing two floating capacitors as negative grid bias supplies in a circuit which employs two triodes in a conventional cathode follower circuit having a resistor string in both cathode circuits. Switching means are provided, and the resistor string values are chosen such that there is provided three ranges for the instrument. The circuit is balanced for zero reading on the meter thereof when both terminals of the meter are connected to equal values of resistance above ground. This adjustment is made initially while both grid capacitors are connected to a point on a voltage divider which is approximately 75% of the anode supply. The principle of operation is to unbalance the meter circuit by choosing, in one cathode resistor string, a value of resistance above ground which would give a meter reading analogous to the amount of radiant energy to be integrated, relay contacts then open the grid capacitor circuits of both triodes, allowing one of these circuits to float while the other is connected to the photo tube. The photo tube current, which is in direct proportion to the intensity of radiation, discharges this capacitor, reestablishing the meter to a balanced condition by lowering the current in its associated cathode string. The instantaneous voltage across this capacitor, subtracted from its initial value at any instant, is analogous to the sum of an infinitely large number of infinitely small intensities occurring during and since the start of the integration period. In other words, this difference in voltage across the capacitor at any instant is substantially proportional to the total quantity of radiant energy measured from the start.

The present invention therefore aims to provide a new and improved method and apparatus for the instrumentation to overcome certain residual inherent disadvantages of the prior art systems. These disadvantages consist essentially of those derived from the escapement mechanism in the first-mentioned prior art system, and the shortcomings of the delicate meter movement and the need for maintaining high insulation resistances for accurate operation, as found in the second-mentioned prior art system.

The above and other objects of the invention will become apparent from a full consideration of the following detailed description and accompanying drawings, wherein:

FIG. 1 is a block-circuit diagram of a preferred embodiment of the invention showing the new integrating radiant energy system.

FIG. 2 shows a series of curves indicating the relative instantaneous values of light flux and current and the voltages at various points of the circuit of the integrating radiant energy system.

FIG. 3 is a detailed circuit diagram of a preferred embodiment of the light integrating system of the present invention, corresponding to FIG. 1.

Referring to the drawings, and more particularly to FIG. 1 rays of light L are shown impinging on the photo-emissive cathode of a photo tube 10, thereby causing the emission of electrons therefrom which are attracted and collected by the positive electrode of the tube. The light flux L of the source thereby provides a photo tube current I resulting therefrom which may vary with time in the manner indicated by the curve A in FIG. 2. This flow of current through the tube 10 tends to charge capacitor 12 until the voltage across the capacitor substantially reaches the value of the ionization potential of the gaseous discharge tube 14. Upon ionizaiton of the tube 14, the capacitor 12 discharges to a potential thereacross approximating the de-ionization, or cut-off, potential of the neon tube 14. Curve B shows the relative voltage of the capacitor during its charge and discharge as above described. Inasmuch as the photo tube current is a generally linear function of the sporadic light flux, the build-up of capacitor voltage will be the integral of photo tube current, or will be proportional to the integral of light flux, for any given instant. Stated in another way, the instantaneous voltage across capacitor 12 is a generally linear function of the area under the curve A of FIG. 2. The magnitude of this area is determined by the ionization and de-ionization potentials of gaseous discharge tube 14 and the capacity of capacitor 12. The result is a series of charges and discharges of capacitor 12, as shown in the resulting wave form shown by curve B, and occur at a rate which is substantially directly proportional to the average charging current or light flux intensity.

When capacitor 12 discharges through the neon tube 14, the discharge current flows through a parallel combination of base resistor 16 and the emitter-to-base circuit of transistor 20 which functions to form a pulse from each of the discharge portions of the curve B. This pulse which is amplified in a second pulse amplifier 24 is then applied through respective capacitors 26, 26 to substantially conventional bistable circuit 27, 27, also generally known as a flip-flop circuit. The input voltage pulses to the flip-flop stage are indicated in curve C of FIG. 2.

The bistable stage is provided with a diode steering circuit 28, shown in FIG. 3, so that succesisve input pulses tend to flip the circuit from one of its stable states to the other. The outputs of each of the bistable sides of the flip-flop circuit are amplified in D.C. amplifier 30 or 32, and the outputs of the amplifiers 30, 32 are applied respectively to the coils 34, 36 of a conventional stepping motor 40, similar to the 45100 Series Commercial Industrial Stepper Motors, manufactured by the A. W. Haydon Company, and as further described in a pending application Serial No. 19,958, filed April 4, 1960, now abandoned. The stepper motor consists of a permanent magnet rotor and an electromagnetic stator. The rotor shaft rotates in discrete 15° steps in response to the alternate energization of the coils 34, 36. The rotor instantly steps when power is applied to one of the coils, and will not step the next 15° increment until power is removed from the first-energized coil and applied to the second coil for energization, and conversely. The voltages in coils 34, 36 which satisfy the above conditions are indicated in curves D and E of FIG. 2.

As is further shown in FIG. 1 and exemplarily illustrated in FIG. 3, the pinion on the rotor 42 of the stepper motor 40 engages a first gear 44 of a gear train. The gears are pivotally mounted in a housing 46.

The housing 46 is pivoted at point 48 and is normally held so that gear 44 is normally disengaged from the rotor pinion 42 by the biasing action of a spring 50, which normally biases the housing to a position generally toward the right-hand direction in FIG. 1. A final gear 52 completes the gear train. The gear 52 is rigidly secured to a shaft 54 which is mounted to rotate about an axis through point 48, and a pointer 56 is mounted on the shaft 54. The pointer normally rests against a stop 58, and the pointer is biased against the stop 58 by a spirally configured spring 60 which is arranged about the shaft 54 and has one end thereof secured to the shaft and its other end secured to a frame element 62. Suitably mounted for rotation around the same axis as shaft 54, for example, rotatably mounted on said shaft, is a settable pointer 64 which is rigidly attached and secured to a knob 66. The pointer 64 has coaxially secured thereto at shaft 54′ a normally closed switch 68 having a flexible leaf 84 extending in the path of a finger 82 on pointer 56, said finger extending parallel to shaft 54. The assembly comprising pointer 64 and switch 68 is rotatable relative to shaft 54, and the pointer 64 is frictionally engaged with a stationary circular scale 70 so that pointer 64 may be manually positioned at any division on the stationary circular scale 70 and will remain there because of its frictional engagement.

After manually setting the pointer 64 to a division mark on the scale 70 representing the desired quantity of illumination that may be integrated by the circuit of the radiant energy system, the operation of the instrument is started by energizing a relay 148 shown in FIG. 3. The relay is maintained energized by the normally closed switch 68. The relay 148 also energizes the solenoid 80, which moves housing 46 to engage gear 44 with pinion 42, and power is supplied through the circuit, and to any other selected functions important to the application, such as opening a shutter on a camera and turning on the original source of light, as will be described in detail hereinbelow.

The alternate energization of coils 34, 36 is at a rate directly proportional to the average light intensity. Such alternate energization advances the rotor pinion 42 in 15° increments or steps. This in turn, through the gear train 44–52, moves the pointer 56 clockwise away from the stop 58 toward the pointer 64. When pointer 56 coincides with the position about the axis of shaft 54 of pointer 64, the finger 82 on pointer 56 engages the leaf 84 of switch 68 to open the switch and thus de energize the above-mentioned relay 148, which in turn deenergizes the solenoid 80 and allows the housing 46 to be moved by the spring 50 in a direction to disengage the first gear 44 of the gear train from the pinion of rotor 42. The spiral spring 60 tends to rotate pointer 56 in a counterclockwise direction to its original position so that the pointer again rests against stop 58. The counterclockwise rotation of the pointer 56 will be slowed down by the retarding action of the gear train to thus prevent excessive hammer and shock blows on the pointer 56.

The pointer 56 and the finger 82 may also be used to control a normally closed switch 92, as shown in FIG. 3. The purpose of the normally closed switch 92 is to initially apply a small amount of A.C. input to the pulse amplifier stage. Assuming this A.C. input to be 60 cycles per second, it would cause the flip-flop stage to operate to advance the rotor of the stepping motor at a rate of 60 steps per second, in which each step is in 15° increments. Assuming the normal average stepping rate to be 10 steps per second while integrating light, this rate caused by the A.C. input would be 6 times the normal operating rate. The purpose of this fast starting rate is to take up the play in the gears 44–52 which comprise the gear train.

Those skilled in the art will recognize the importance to the accurate functioning of the instrumentation system of maintaining high insulation resistances between the junction, comprising the cathode of photo tube 10, the electrode of the gaseous discharge tube 14 connected directly to the photo tube, and the upper terminal of capacitor 12, to other points of the circuit. Because of the nature of the circuit and the small physical size of the components associated with this critical junction, the above-mentioned components together with transistor 20 may be contained in the same small compartment or case which comprises the light sensing portion of the instrumentation system. This is a distinct advantage over some of the prior art devices in which the photo tube was contained in its own housing and was connected to the rest of the circuitry by means of a long cable. Another advantage provided in the disclosed arrangement of the instrumentation system is the rugged nature of the mechanical portion of the instrument, which consists of the above-mentioned stepping motor, operating in steps without the aid of reciprocating mechanical parts, such as an escapement mechanism often used in the prior art. Also, no delicate meter movement as has been employed in much of the prior art, is necessary in the present invention for the attainment of improved reliability and accuracy.

Referring now more particularly to the schematic diagram of FIG. 3 which illustrates a preferred embodiment of the invention, there are provided the specific controls and functions designed for graphic arts camera use.

Designated generally at 94 is a connection unit having a conventional line plug 92′, to the terminals of which are connected the respective line wires 306, 307 and 308, the line wire 308 being grounded. Line wire 306 is connected by a wire 309 to one terminal of the primary 310 of a power supply transformer 96 in the power supply and filter network section 98 of the apparatus. A wire 311 is connected to the other terminal of primary 310. Wire 311 is connected through the normally open "Start" switch 303 and the normally closed "Stop" switch 304 of control unit 160 to a wire 313. Wire 313 is connected through the normally closed "Stop" switch 304′ and "Cancel" switch 305′ of remote control unit 180 to a wire 314 which in turn is connected through the normally closed "Stop" switch 305 and the normally closed switch 68 of control unit 160, and through a fuse 158 to the line wire 307. One secondary winding 315 of transformer 96 is connected to a rectification and filter network including diodes 99, capacitors 100 and resistors 101, 102, having an output terminal 204, providing the D.C. power supply to the transistor stages of the integrating radiant energy system. Another secondary winding 104 provides the D.C. power supply to the photo tube 10 through a filter network 106 and a wire 316. This supply from the filter network applied to the photo tube 10 can provide a greater potential than the ionization potential of the neon tube 14.

The bistable or flip-flop circuit 27, 27 includes a transistor circuit arrangement 108, 110, including the attendant diodes, condensers and resistor circuitry as shown. Transistor 112, resistors 114, 114′, 114″, 116, and the input capacitors 26, 26 comprise the second pulse amplifier 24 and the input circuit to the flip-flop stage. Transistors 120, 122, with resistors 124 and 124′, comprise the D.C. amplifier for one side of the flip-flop stage, as do transistors 128, 134, with resistors 134′ and 134″, for the other side. Resistors 140 and 140′ establish the proper base-to-emitter potentials for transistors 120, 122, 128 and 134, and resistor 142 establishes the proper emitter potential for flip-flop transistors in the flip-flop sections 108, 110, as shown.

The control unit 160 includes the normally open, manually controlled "Lights" switch 301, the normally open, manually controlled "Shutter" switch 302, the normally open, manually controlled "Start" switch 303, the normally closed, manually controlled "Stop" switch 304, and the normally closed, manually controlled "Cancel" switch 305. Corresponding manually controlled switches 301′ to 305′ are included in the remote control unit 180.

Control unit 160 also includes shutter and power pilot lights 172 and 174, relays 144, 146 and 148, solenoid switch 150, and stepper motor 40, with associated parts including switch 68, with leaf 84, gears 44–52, pointer 56, springs 50 and 60, pointer 64, knob 66, and shaft 54, together with a buzzer 156, the fuse 158, and various relay and solenoid D.C. power supply components, such as diodes 164 with their circuit-connected resistors 166, the circuit-related filter capacitors 168, pilot light resistors 170 for the shutter pilot light 172 and the power pilot light 174.

The remote control unit 180 includes manually operated switches 301′, 302′, 303′, 304′ and 305′ and shutter pilot light 178 which are duplicates of those contained in the control unit.

The transistor 20 of the photo tube unit, together with condenser 12 and neon tube 14, as well as the photo tube 10 and the attendant resistances in circuit therewith, comprise the light sensing, the integrating and pulse producing unit for providing the initial pulse signals that after amplification operate the stepper motor.

The electromagnetically-actuated shutter consists of a circuit including the solenoid 182, diode 184, and capacitor 186, connected across the solenoid, for actuating the shutter 188.

The above-described control unit 160, the remote control unit 180, and the photo tube unit 190′, the shutter 188, and the output control for the equipment lamps shown at 200, together with the input power plug 92′, are interconnected by means of suitable cables and plug connectors through the connection unit 94.

The operation of the apparatus is as follows: pointer 64 is manually set by means of knob 66 to a division mark on scale 70 representing a desired quantity of illumination to be integrated for a photographic exposure. This closes switch 68, which connects the power supply conductors 306 and 307 to the power pilot light 174 through a circuit comprising wire 307, fuse 158, switch 68, a resistor 170, pilot light 174, and wire 306, thus energizing said pilot light 174.

Either of the "Start" switches 303 or 303′ may then be closed, thereby energizing the primary 310 of transformer 96 and the relay 148. Assuming the switch 303 to be closed, the primary 310 is energized by a circuit comprising wire 307, fuse 158, switch 68, switch 305, wire 314, switch 305′, switch 304′, wire 313, switch 304, switch 303, wire 311, primary 310, wire 309, and wire 306. Relay 148 is energized by a circuit comprising wire 311, the relay winding, a resistor 166, a diode 164, and the wire 306. Relay 148 is held energized by the enclosure of its contacts 190, which are connected in shunt with "Start" switch 303.

The energization of relay 148 energizes relay 146 through a circuit comprising wire 311, contacts 190 of relay 148, a wire 319, contacts 192 of relay 148, a wire 320, the winding of relay 146, a resistor 166, a diode 164, and the line wire 306.

Relay 146 is held energized by the closure of its contacts 194, connected in shunt with the contacts 192 of relay 148.

The energization of relay 146 energizes the shutter solenoid 182 through a circuit comprising wire 311, contacts 190, wire 319, contacts 194, a wire 321, diode 184, solenoid 182, a wire 322, and line wire 306. Shutter pilot light 172 is energized by a circuit comprising wire 320, a resistor 170, pilot light 172, and line wire 306, as is shutter pilot light 178 through resistor 170′.

The energization of relay 146 energizes the relay 144 by a circuit comprising wire 319, contacts 196, the winding of relay 144, a resistor 166, a diode 164, and line wire 306. Relay 144 is held energized by the closure of its contacts 198, which are connected in shunt with contacts 196.

The closure of contacts 198 supplies output power at terminals 200 for operating the camera lamps, by a circuit comprising wire 319, contacts 198, a wire 323, the camera lamps (not shown), and line wire 306.

The closure of contacts 202 of relay 144 connects the D.C. power supply output terminal 204 to the transistor circuit.

The closure of contacts 206 of relay 148 energizes the solenoid 80 through a circuit comprising wire 319, switch 304, wire 313, switch 304′, a wire 324, contacts 206, solenoid 80, a resistor 166, a diode 164, and line wire 306. Solenoid 80 is held energized by the solenoid-operated switch 150 which shunts contacts 206. Energized solenoid 80 moves housing 46 against the force of spring 50 so that the gear 44 in the gear train engages the pinion of stepping motor rotor 42.

At this point, rotor 42 of stepping motor 40 starts to rotate in discrete 15° steps at a rate equal to the power line frequency, which takes up the play in gears 44-52. This is due to the A.C. input to the pulse amplifier 24, said A.C. input being taken from transformer secondary 315 through a wire 325, normally closed switch 92, a wire 326, and resistor 114, connected to the base of transistor 112. As soon as pointer 56 leaves stop 58, the switch 92 is opened, which interrupts the A.C. input to pulse amplifier 24. Pointer 56 then progresses in steps at a rate directly proportional to the average intensity of light impinging on the photo-emissive cathode of photo tube 10, as previously explained in connection with FIGS. 1 and 2.

When the finger 82 on pointer 56 engages leaf 84 on switch 68, which is attached to pointer 64, switch 68 is opened, thus interrupting the power to relays 144, 146 and 148, and to solenoid 80. This in turn turns off all the functions initiated by these relays and the solenoid. Solenoid 80, being deenergized, allows housing 46, urged by spring 50, to disengage first gear 44 of the gear train from the pinion of rotor 42, allowing pointer 56, urged by spring 60, to reset counterclockwise against stop 58, ready for the next exposure.

If either "Shutter" switch 302 of control unit 160 or 302' of remote control unit 180 is momentarily closed, this energizes relay 146, which operates the shutter 188 and energizes the shutter pilot lights 172 and 178. Thus, for example, if switch 302 or 302' is closed, relay 146 is energized from wires 313 and 314, through switch 68 and fuse 158 to line wire 307.

Similarly, if either of the "Light" switches 301 or 301' is closed, this energizes relay 144 (through wires 313 and 314, through switch 68 and fuse 158 to line wire 307), supplying output power at terminals 200 for turning on the camera lamps.

Both of the above-mentioned functions can be turned off by momentary opening of either of the "Cancel" switches 305 or 305', which will also cancel an exposure that has already been started, as it interrupts power to the three relays and the solenoid 80.

After an exposure has been started, if either of the "Stop" switches 304 or 304' is momentarily opened, this will interrupt power to the three relays, allowing them to drop out, thus turning off their functions, but this will not interrupt power to solenoid 80, which remains energized. This keeps the pinion on rotor 42 engaged with gear 44 of the gear train. The integrating and flip-flop circuits will be deenergized and inoperative. However, due to the permanent magnet structure of the stepping motor 40, rotor 42 is magnetically detented and therefore pointer 56 cannot move. In effect, exposure has been stopped and can be later resumed, reset or cancelled at the option of the operator. In this condition, buzzer 156 will operate through contacts 212, supplied with A.C. power by solenoid switch 150, giving an audible signal indicating that exposure is suspended.

In the event that the remote control unit 180 is not employed, jumper plug 215 is plugged into the connection unit to shunt the wires 313, 324 and 314.

Although the apparatus shown in FIGS. 1, 2 and 3 illustrates a preferred embodiment of the invention, the essential characteristics of the invention are the use of a capacitor that is charged by the current from a photo sensitive device, said current being in direct proportion to light impinging on said photo sensitive device, and a discharge device associated with said capacitor to discharge same when it is charged to some desired potential, bistable means operated by said discharge device so that at each discharge the bistable means will alternate from one of its stable conditions to the other, an electro-mechanical stepping device operated by said bistable means, said stepping device being provided with indicating means, and switching means to turn off other apparatus and functions that may have been initiated originally.

Examples of possible modifications of the preferred embodiment without deviating from the scope of the invention include the use of various types of photo sensitive devices, particularly adapted for certain applications, such as the use of photo-multiplier type devices for ultra sensitive applications. Many other modifications will become apparent to those skilled in the art, such as the use of vacuum tubes or gas-filled tubes instead of transistors. Also, the electrical control functions can be altered or may be augmented to better suit the instrumentation for particular applications. Also, the spectral energy distribution characteristics of the photo sensitive device may be altered or modified by the use of color filters to suit particular applications. Also, the luminous sensitivity of the photo sensitive device can be altered by the use of neutral density filters without affecting the spectral response characteristics. Such schemes as the use of a plurality of stepping devices and photo sensitive devices with switching means for selecting the one to be employed for particular applications are also contemplated herein. Other types of rotary stepping motors or devices may be used instead of the Haydon Motor above referred to. Other design modifications of the pointers and scale may be employed, such as straight scales instead of circular ones. Also, operation of the pointer 56 in reverse to the method mentioned above may be employed. Thus, manually settable pointer 64 may be provided with the stop 58 and the switch 68 may be positioned at the zero point of the scale, previously occupied by the stop 58; spiral spring 60 would then urge pointer 56 clockwise towards stop 58 affixed to pointer 64 and pointer 56 would progress counterclockwise during exposure, namely, towards the switch 68, and reset clockwise against stop 58 affixed to pointer 64.

It should be understood that the specific apparatus herein illustrated and described is intended to be representative only, as many changes may be made therein without departing from the clear teachings of the invention. Accordingly, reference should be made to the following claims in determining the full scope of the invention.

What is claimed is:

1. An integrating radiant energy system comprising radiant energy-sensitive means, means to form respective electrical pulses responsive to the reception of predetermined quantities of radiant energy flux by said radiant energy-sensitive means, a stepping motor having an armature driven through discrete rotary steps responsive to the reception of successive pulses by the motor, means to apply the pulses to said motor, first indication means connected to said armature and being driven thereby, manually settable second indication means arranged in the path of movement of said first indication means, and means to terminate the operation of said motor responsive to the interengagement of said first and second indication means.

2. An integrating radiant energy system comprising radiant energy-sensitive means, means to form respective electrical pulses responsive to the reception of predetermined quantities of radiant energy flux by said radiant energy-sensitive means, a stepping motor having an armature driven through a predetermined rotary step responsive to the reception of a pulse by the motor, means to apply the pulses formed by said electrical pulse forming means to said motor, first indication means connected to said armature and being driven thereby, manually settable second indicator means arranged in the path of movement of said first indication means, and means to terminate operation of said motor and said pulse forming means responsive to the interengagement of said first and second indication means.

3. An integrating radiant energy system comprising radiant energy-sensitive means, means to form respective electrical pulses responsive to the reception of predetermined quantities of radiant energy flux by said radiant energy-sensitive means, a stepping motor having an armature driven through discrete rotary steps responsive to the reception of successive pulses by the motor, means to apply the pulses to said motor, a camera shutter, means to open said shutter simultaneously with the initial application of said pulses to the motor, first indication means connected to said armature and being driven thereby, manually settable second indication means arranged in the path of movement of said first indication means, and means to close said shutter responsive to the interengagement of said first and second indication means.

4. An integrating radiant energy system comprising radiant energy-sensitive means, means to form respective electrical pulses responsive to the reception of predetermined quantities of radiant energy flux by said radiant energy-sensitive means, a stepping motor having an armature driven through discrete rotary steps responsive to the reception of successive pulses by the motor, means to apply the pulses to the motor, photographic lamp supply conductors, means to energize said supply conductors simultaneously with the initial application of said pulses to the motor, first indication means connected to said armature and being driven thereby, manually settable second indication means arranged in the path of movement of said first indication means, and means to deenergize said supply conductors responsive to the interengagement of said first and second indication means.

5. An integrating radiant energy system comprising radiant energy-sensitive means, capacitance means, means to charge said capacitance means responsive to the reception of radiant energy flux by said radiant energy-sensitive means, means to discharge said capacitance means when a predetermined amount of flux has been received, means to form an electrical pulse from the discharge of said capacitance means, a stepping motor having an armature driven through a discrete rotary step responsive to the reception of an electrical pulse by the motor, means to apply such pulses successively to the motor, first indication means connected to said armature and being driven thereby, manually settable second indication means arranged in the path of movement of said first indication means, photographic means, means to initiate operation of said photographic means simultaneously with the initial application of pulses to the motor, and means to terminate operation of said photographic means responsive to the interengagement of said first and second indication means.

6. The structure of claim 5, and wherein said photographic means comprises a shutter.

7. The structure of claim 5, and wherein said photographic means comprises a light source.

8. An integrating radiant energy system comprising a radiant energy pickup means, a charge means being charged in proportion to the magnitude of the radiant energy detected by the pickup means, pulse forming means actuated by the discharge of the charge means by discharge means, a bistable means operated by pulses from the pulse forming means, coil means connected in circuit with the bistable means, a motor armature coupled to the coil means for rotating in one direction in response to the output of the bistable means applied to the coil means, an indication gear means coupled to the armature, a solenoid and spring, means to disengage the gear means from the armature in response to bias provided by said spring and to engage the gear means with the armature in response to energization of said solenoid, said indication gear means including a manually settable pointer mounted for rotation in a direction indicative of the energy being integrated, an indicating pointer connected to said gear means generally biased in a direction opposite to the direction of rotation of said gear means when motivated by said armature, a stop to distrain the movement of the indicating pointer beyond a reference point, a first switch providing a control function upon any movement of the indicating pointer away from the stop, and a second switch associated with the manually settable pointer to provide a control function upon movement of the indicating pointer to a position substantially coincident with the manually settable pointer, said control function of the first switch being adapted to take up play in the gear means, and said control function of said second switch being adapted to cause termination of integration of said radiant energy by the system.

9. An integrating radiant energy system comprising a radiant energy pickup means to provide a measuring current, coil means responsive to said measuring current, a motor armature electrically coupled to the coil mean for rotation in one direction in response to the measuring current, an indication gear means coupled to the armature, a solenoid and spring, means to disengage the gear means from said armature in response to bias provided by said spring and to engage the gear means with the armature in response to energization of said solenoid, said indication gear means including a manually settable pointer mounted for rotation in a direction indicative of the energy being integrated, an indicating pointer connected to said gear means and generally biased in a direction opposite to said last-named direction of rotation, a stop to distrain the movement of the indicating pointer beyond a reference point, a first switch providing a first control function upon any movement of the indicating pointer away from the stop, and a second switch associated with the manually settable pointer to provide a second control function upon movement of the indicating pointer to a position substantially coincident with the manually settable pointer, said first control function being to prepare the gear means for the commencement of integration of said radiant energy, and said second control function being to cause termination of integration of said radiant energy by the system.

10. An integrating radiant energy system comprising a radiant energy pickup means, a charge-discharge means being charged in proportion to the magnitude of the radiant energy detected by the pickup means, a pulse forming means to translate the detected radiant energy into pulses, bistable means actuated by said pulses, coil means connected in circuit with the bistable means, a motor armature electrically coupled to the coil means for rotation in one direction in response to the output of the bistable means applied to the coil means, an indication gear means coupled to the armature, a solenoid and a spring, said gear means being pivotally mounted relative to said armature, said spring being connected so as to bias the gear means away from coupling engagement with the armature, said solenoid being mounted so as to move the gear means into coupling engagement with the armature in response to energization of the solenoid, said indication gear means including a manually settable pointer mounted for rotation in a direction indicative of radiant energy being integrated, an indicating pointer connected to said gear means and mounted for rotation around the same axis as said manually settable pointer and being generally biased in a direction opposite to said last-named direction of rotation, a stop to distrain the movement of the indicating pointer beyond a reference point, and a switch associated with the manually settable pointer to provide a control function upon movement of the indicating pointer to a position substantially coincident with the manually settable pointer, said control function being to cause the termination of integration of said radiant energy by the system.

11. An integrating radiant energy system comprising a coil means, means to energize said coil means in accordance with a measure of the integration of radiant energy, a motor armature coupled to the coil means for rotation in one direction in response to the energy applied to the coil means, an indication gear means mounted adjacent the armature, a solenoid, means to couple said gear means to the armature in response to energization of said solenoid, said indication gear means including a manually settable pointer mounted for rotation in a direction indicative of the integration of radiant energy, an indicating pointer connected to said gear means and generally biased in a direction opposite to said last-named direction, a stop to distrain the movement of the indicating pointer beyond a reference point, and a switch associated with the manually settable pointer to provide a control function upon movement of the indicating pointer beyond a reference point, and a switch associated with the manually settable pointer to provide a control function upon movement of the indicating pointer to a position substantially coincident with the manually settable pointer, said control function being to cause termination of integration of said radiant energy by the system.

12. In combination with the structure of claim 11, a shutter, means to simultaneously energize said solenoid and open said shutter, and means to simultaneously deenergize said solenoid and close said shutter upon operation of said switch when the indicating pointer reaches said position substantially coincident with the manually settable pointer.

13. In combination with the structure of claim 11, lamp supply conductors, means to simultaneously energize said solenoid and said lamp supply conductors, and means to simultaneously deenergize said solenoid and lamp supply conductors upon operation of said switch when the indicating pointer reaches said position substantially coincident with the manually settable pointer.

14. In combination with the structure of claim 11, a shutter, lamp supply conductors, means to simultaneously energize said solenoid, open said shutter, and energize said lamp supply conductors, and means to simultaneously deenergize said solenoid and lamp supply conductors and close said shutter when the indicating pointer operates said switch upon reaching said position substantially coincident with the manually settable pointer.

References Cited by the Examiner
UNITED STATES PATENTS

| | | | |
|---|---|---|---|
| 2,408,576 | 10/1946 | Ost | 307—157 |
| 2,844,316 | 7/1958 | Liebknecht | 310—49 X |
| 2,872,075 | 2/1959 | Steiner | 200—38 X |
| 2,916,570 | 12/1959 | Nakamura | 200—38 X |
| 2,946,902 | 7/1960 | Hagen | 200—38 X |

NORTON ANSHER, *Primary Examiner.*

J. F. PETERS, *Assistant Examiner.*